(12) United States Patent
Hatakeyama (10) Patent No.: US 7,958,371 B2
(45) Date of Patent: Jun. 7, 2011

(54) METHODS AND APPARATUS FOR SECURE OPERATING SYSTEM DISTRIBUTION IN A MULTIPROCESSOR SYSTEM

(75) Inventor: Akiyuki Hatakeyama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1063 days.

(21) Appl. No.: 11/746,416

(22) Filed: May 9, 2007

(65) Prior Publication Data
US 2008/0282084 A1 Nov. 13, 2008

(51) Int. Cl.
*G06F 12/14* (2006.01)
(52) U.S. Cl. ........ 713/189; 713/170; 713/187; 713/190; 713/193; 380/22; 380/30; 380/201; 726/4; 726/27
(58) Field of Classification Search .................. None
See application file for complete search history.

(56) References Cited

U.S. PATENT DOCUMENTS

| | | |
|---|---|---|
| 6,526,491 B2 | 2/2003 | Suzuoki et al. |
| 2002/0112161 A1* | 8/2002 | Thomas et al. ............... 713/176 |
| 2003/0140244 A1* | 7/2003 | Dahan et al. .................. 713/200 |
| 2003/0204738 A1* | 10/2003 | Morgan ......................... 713/194 |
| 2004/0151308 A1* | 8/2004 | Kacker et al. .................... 380/30 |
| 2004/0225894 A1* | 11/2004 | Colvin .......................... 713/200 |
| 2005/0132217 A1* | 6/2005 | Srinivasan et al. ............. 713/200 |
| 2006/0015945 A1* | 1/2006 | Fields .............................. 726/27 |
| 2006/0188093 A1* | 8/2006 | Kamibayashi et al. ......... 380/22 |
| 2007/0113079 A1* | 5/2007 | Ito et al. ......................... 713/166 |
| 2007/0118769 A1* | 5/2007 | England et al. ............... 713/193 |

FOREIGN PATENT DOCUMENTS

WO WO2006054128 * 5/2006

OTHER PUBLICATIONS

Sony, Cell Broadband Engine Architecture, http://cell.scei.co.jp/e_download.html (Aug. 8, 2005).
Sony, Cell Broadband Engine Architecture, http://cell.scei.co.jp/e_download.html (Oct. 3, 2006).

* cited by examiner

*Primary Examiner* — Taghi T Arani
*Assistant Examiner* — Gregory Lane
(74) *Attorney, Agent, or Firm* — Matthew B. Dernier; Gibson & Dernier LLP

(57) ABSTRACT

Methods and apparatus provide for: decrypting a first of a plurality of operating systems (OSs) within a first processor of a multiprocessing system using a private key thereof, the plurality of OSs having been encrypted by a trusted third party, other than a manufacturer of the multiprocessing system, using respective public keys, each paired with the private key; executing an authentication program using the first processor to verify that the first OS is valid; and executing the first OS on the first processor.

18 Claims, 6 Drawing Sheets

METHODS AND APPARATUS FOR SECURE OPERATING SYSTEM DISTRIBUTION IN A MULTIPROCESSOR SYSTEM

BACKGROUND OF THE INVENTION

The present invention relates to methods and apparatus for securely distributing one or more operating systems in a multiprocessing environment. More particularly, the present invention relates to methods and apparatus for managing the secure distribution of one or more operating systems to hardware manufacturers and for loading and executing the one or more operating systems without subjecting the operating systems to unauthorized access or modification in a multiprocessing environment.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast number of data accesses, data computations, and data manipulations in relatively short periods of time to achieve desirable visual results. Real-time, multimedia applications also place a high demand on processing systems; indeed, they require extremely fast processing speeds, such as many thousands of megabits of data per second.

While some processing systems employ a single processor to achieve fast processing speeds, others are implemented utilizing multiprocessor architectures. In such multiprocessor systems, a plurality of sub-processors or processing elements operate substantially in parallel (or at least in concert) to achieve desired processing results. In this case, each individual processor in a cell typically has an operating system that is loaded into a memory (local to the processor or shared with other processors) and executed to boot up the processor.

During manufacturing of the conventional multiprocessing systems, a software developer provides an operating system to a hardware manufacturer to be loaded onto the multiprocessing system. As certain aspects of the operating system may be proprietary to the software developer, the operating system may include one or more security features and/or agreements with the hardware manufacturer to maintain any proprietary information in confidence. This conventional approach to OS security becomes problematic when the hardware manufacturer is a competitor of the operating system developer. This may become more common as multiprocessing systems employ more than one operating system running on more than one processor and/or more than one operating system running on the same processor at different times. Indeed, it is contemplated that multiprocessing systems will be open for use by many users and programs, each potentially with differing OS platforms. In this case, the proprietary details of each operating system may not only have to be kept secret from the hardware manufacturer, but also from possibly competing software developers whose software products are used in the same multiprocessing environment.

A need, therefore, arises for a method and system that addresses the above issues by providing a secure environment for one or more operating systems in a multiprocessing architecture.

SUMMARY OF THE INVENTION

In accordance with one or more embodiments, the present invention relates to a technique for managing the secure distribution and invocation of multiple operating systems in a multiprocessing system. The multiplicity of processors in a multiprocessing system permits the theoretical execution of more than one operating system platform within a single system. For example one or more processors may invoke OS #1 and one or more other processors may invoke OS #2. In practice, the owners of operating systems may not wish to have their operating systems easily accessed and/or modified either during the manufacturing process or during use of the multi-processing system.

In accordance with one or more embodiments, the present invention provides apparatus and methods for maintaining security for operating systems while they are distributed to system manufacturers for loading into multiprocessing systems and while they are invoked within the system. The apparatus includes a multiprocessing system employing a plurality of processors. The system includes a secret key that may not be read by an unauthorized entity (such as by storing the key in a secure ROM). The secret key is provided to an authorized third party. The third party creates a public key paired with the secret key for each operating system that is to be loaded into the system. The third party then encrypts each operating system with the corresponding public key and transfers the encrypted operating systems to the system manufacturer. The third party also encrypts an authentication program with the secret key and transmits same to the system manufacturer. The system manufacturer stores the encrypted operating systems and the encrypted authentication program in one or more ROMs. The system is then sold to an end user. In an alternative embodiment, the encrypted authentication program and/or operating systems may be purchased after the system is purchased by the end user, for example, over a packet switched network. In order to invoke an operating system, the authentication program is decrypted using the secret key. (It is noted that a secure boot sequence followed by entering an isolated mode may precede the decryption of the authentication program). The authentication program may then be used to decrypt the operating system and authenticate same, for example using a hash routine. Thereafter the OS may be executed.

In accordance with one or more embodiments of the present invention, methods and apparatus provide for: decrypting a first of a plurality of operating systems (OSs) within a first processor of a multiprocessing system using a private key thereof, the plurality of OSs having been encrypted by a trusted third party, other than a manufacturer of the multiprocessing system, using respective public keys, each paired with the private key; executing an authentication program using the first processor to verify that the first OS is valid; and executing the first OS on the first processor.

The methods and apparatus may also provide for: decrypting a second of the plurality of OSs within a second processor of the multiprocessing system using the private key thereof; executing the authentication program using the second processor to verify that the second OS is valid; and executing the second OS on the second processor.

The first and second OSs may be executed simultaneously. Alternatively or in addition, different OSs may be executed on the same processor at different times. For example, the methods and apparatus may also provide for: terminating execution of the first OS on the first processor; decrypting a second of the plurality of OSs within the first processor using the private key; executing the authentication program using the first processor to verify that the second OS is valid; and executing the second OS on the first processor.

Preferably, the plurality of OSs have been digitally signed prior to encryption and the authentication program includes verifying the digital signature. The digital signature of each OS may include a respective hash value and the authentication program verifies the digital signature of a given one of the OSs by running a hash program thereon and comparing a hash result with the respective hash value.

The encrypted OSs may be stored in at least one secure storage medium which is accessible only by the processors of the multiprocessing system.

The methods and apparatus may also provide for: entering into a secure mode of the first processor prior to decrypting the authentication program, the secure mode permitting data transfers into and out of the first processor that are initiated by the first processor but prohibiting data transfers into and out of the first processor that are initiated by external devices to the first processor. The methods and apparatus may also provide for leaving the secure mode after the first OS has been authenticated.

In accordance with one or more further embodiments of the present invention, methods and apparatus may provide for: transmitting a private key associated with a particular multiprocessing system to a trusted third party, other than a manufacturer of the multiprocessing system; receiving a plurality of operating systems (OSs) from the trusted third party, each OS having been encrypted by the trusted third party using respective public keys, each paired with the private key; and storing the plurality of OSs within at least one secure storage medium of the multiprocessing system, such that each may be executed by one or more processors thereof.

The methods and apparatus may provide for: receiving an authentication program from the trusted third party, the authentication program having been encrypted by the trusted third party using the private key; and storing the authentication program within the at least one secure storage medium of the multiprocessing system, such that it may be executed by the one or more processors to verify the OSs.

In accordance with one or more further embodiments of the present invention, methods and apparatus may provide for: receiving a private key associated with a particular multiprocessing system from a provider of the multiprocessing system; encrypting a plurality of operating systems (OSs), each with a respective public keys that is paired with the private key; and transmitting the encrypted OSs to the provider for secure storage in the multiprocessing system such that each may be executed by one or more processors thereof.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
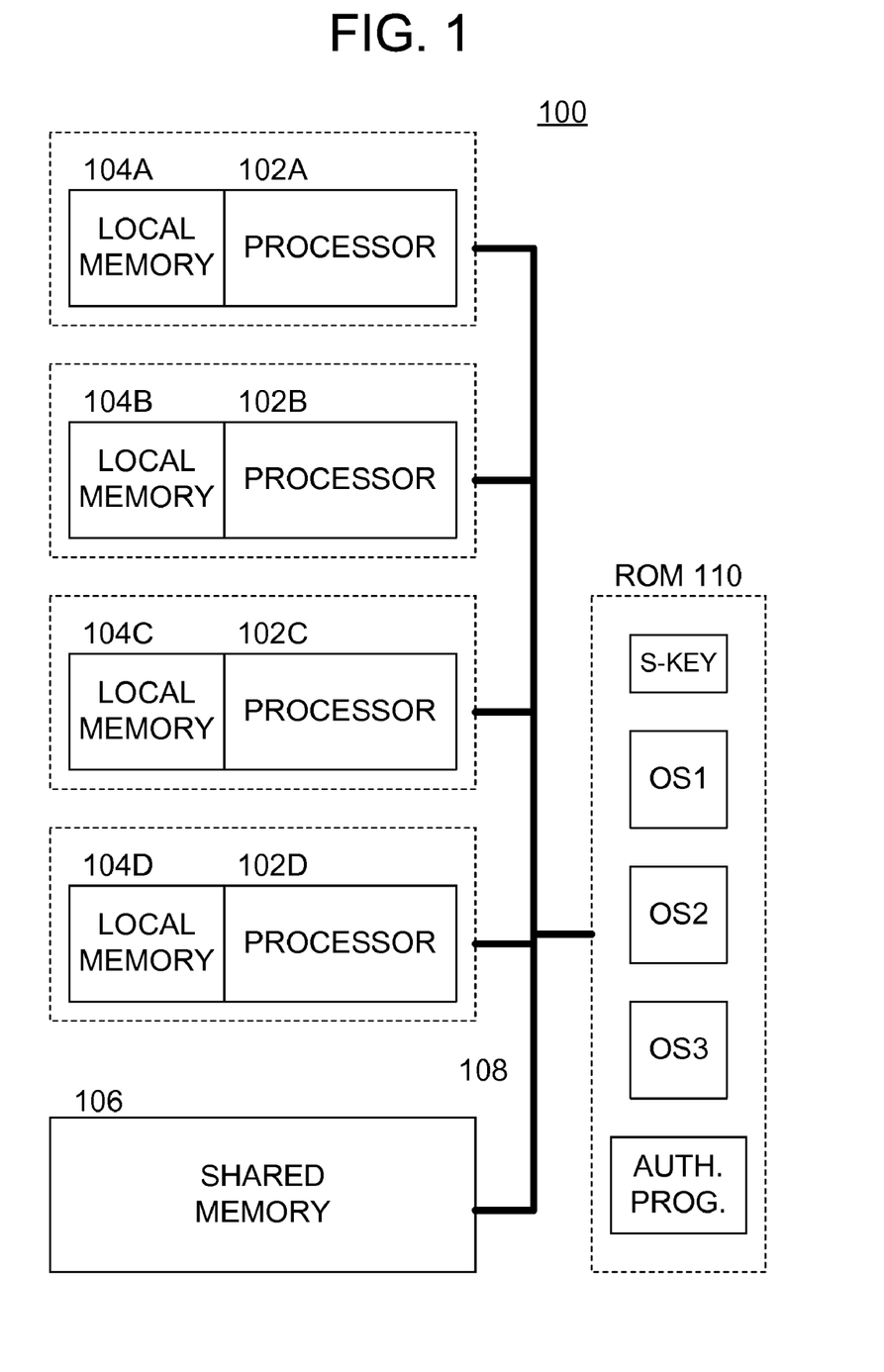
FIG. 1 is a block diagram of multiprocessing system in accordance with one or more embodiments of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

FIG. 1 is a block diagram of a multi-processing system 100 that may be adapted to implement the features discussed herein and one or more further embodiments of the present invention. The system 100 includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

As is generally known in the art, processors typically require and operating system platform from which to launch and execute application programs. The operating system is operable to allocate system resources, including memory, processor time, disk space, peripheral devices, etc. Application programs use the OS to access these system resources on an as-needed basis. While a single OS usually remains in processor memory at all times during the processor operation, various embodiments of the invention contemplate executing different OSs on different processors 102 concurrently and/or changing OSs from time to time as desired by a programmer. These functions and others will be discussed in more detail below.

The processors 102 may be implemented utilizing any of the known technologies that are capable of requesting data from the system memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

It is noted that as used herein, the term "data" is broadly construed to include any type of program code, application software, system level software, any type of data, a data stream, etc.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function. As on-chip space may be limited, the size of the local memories 104 may be much smaller than the system memory 106.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown, which may be disposed internally or externally with respect to the processors 102.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. In such embodiments, the main processor is preferably a full-instruction set processor for fetching, decoding and executing instructions and comprises a locally accessible memory for storing data and program code that may be micro-coded and/or assembled, compiled or interpreted from various high-level or low-level languages. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

In embodiments where a main processor is employed, the remaining processors 1023 are preferably reduced instruction set computers (RISC) for processing various applications data (graphics, multimedia, telecommunications, etc.) substantially in parallel and independent of each other.

Although not shown, various alternative embodiments of the system 100 may include an Input/Output (I/O) interface for inputting and outputting data from/to various circuits and/or peripheral devices, a memory interface for managing access to data residing in main or shared memory 106, such data being requested by the processors 102. Portions of the data and program code executed and/or manipulated by the processors 102 are typically swapped into and out of local memories 104 during fetch, decode and/or execution cycles. Access to the data and program code residing in the main memory 106 is managed by the memory interface.

The apparatus 100 also preferably includes a secure storage medium, such as secure ROM 110 that is operatively coupled to the processor 102, e.g., through the bus 108. The apparatus 100 also preferably includes a decryption unit (not shown) that is operatively coupled to the processor 102 and operable to decrypt information using a secure decryption key. It is preferred that the processor 102, the local memory 104, and the decryption unit are disposed on a common integrated circuit. Thus, combinations of these elements may be referred to herein as "the processor 102." It is preferred that the ROM 110 is disposed off-chip from at least the processors 102 and the shared memory 106. In an alternative embodiment, the storage medium 110 may also be disposed on the common integrated circuit with one or more of the other elements.

Preferably, the decryption unit is a hardware-implemented device, such as a permanently programmable device (e.g., a flash ROM that has been programmed utilizing an algorithm defining a decryption process). The use of a permanently programmable circuit to implement the decryption unit is desirable to achieve a level of security in which the decryption function cannot be tampered with by external software manipulation.

The storage medium 110 is preferably a secure device, such as a permanently programmable ROM that contains a plurality of encrypted operating system (OS) programs, and/or other data useful in initializing the processor 102, individually or collectively, to run any of a number of OSs. The storage medium 110 also preferably includes an encrypted authentication program, which will be discussed in more detail hereinbelow. As known to those skilled in the art, an operating system is the software, when executed by a processor, is operable to allocate system resources, including memory, processor time, disk space, peripheral devices, etc. Application programs use the OS to access these system resources on an as-needed basis. As the processor boots up, the OS is typically the first program to be loaded into the processor memory from either external memory storage or internal memory storage. Usually the OS remains in processor memory at all times thereafter during the processor operation. As will be discussed hereinbelow, however, the invention contemplates executing different OSs on different processors 102 concurrently as well as changing OSs from time to time as desired by a programmer.

The security of the storage medium 110 is preferably such that the encrypted OSs, authentication program, and/or other information may not be accessed by unauthorized entities. For example, the encrypted OSs and authentication program are preferably established during the manufacture of the apparatus 100.

The apparatus 100 is preferably operable to permit the processors 102 to invoke more than one operating system without subjecting the operating systems to unauthorized access or alteration. For example, a first processor 102A is operable to invoke a first operating system (such as Microsoft Windows), while a second processor is operable to invoke a second operating system (such as Unix). The execution of the respective operating systems may be concurrent, each OS running on a different processor 102. Alternatively, two or more operating systems may be invoked by a single processor 102, each OS being invoked at a different time. Notably, various embodiments of the present invention provide security measures to prevent tampering with the operating systems, either during execution or while they are stored in the multiprocessing system 100.

In accordance with one or more embodiments of the present invention, the security features include that the respective operating systems are stored in encrypted (and preferably digitally signed) in the ROM 110 during the manufacturing of the multiprocessing system 100. In alternative embodiments, further encrypted operating system programs may be purchased by the end user of the system 100 for a fee (or via freeware). Although not preferred for security reasons, such further operating system programs may be obtained via a packet switched network, such as the Internet.

Figure 2:
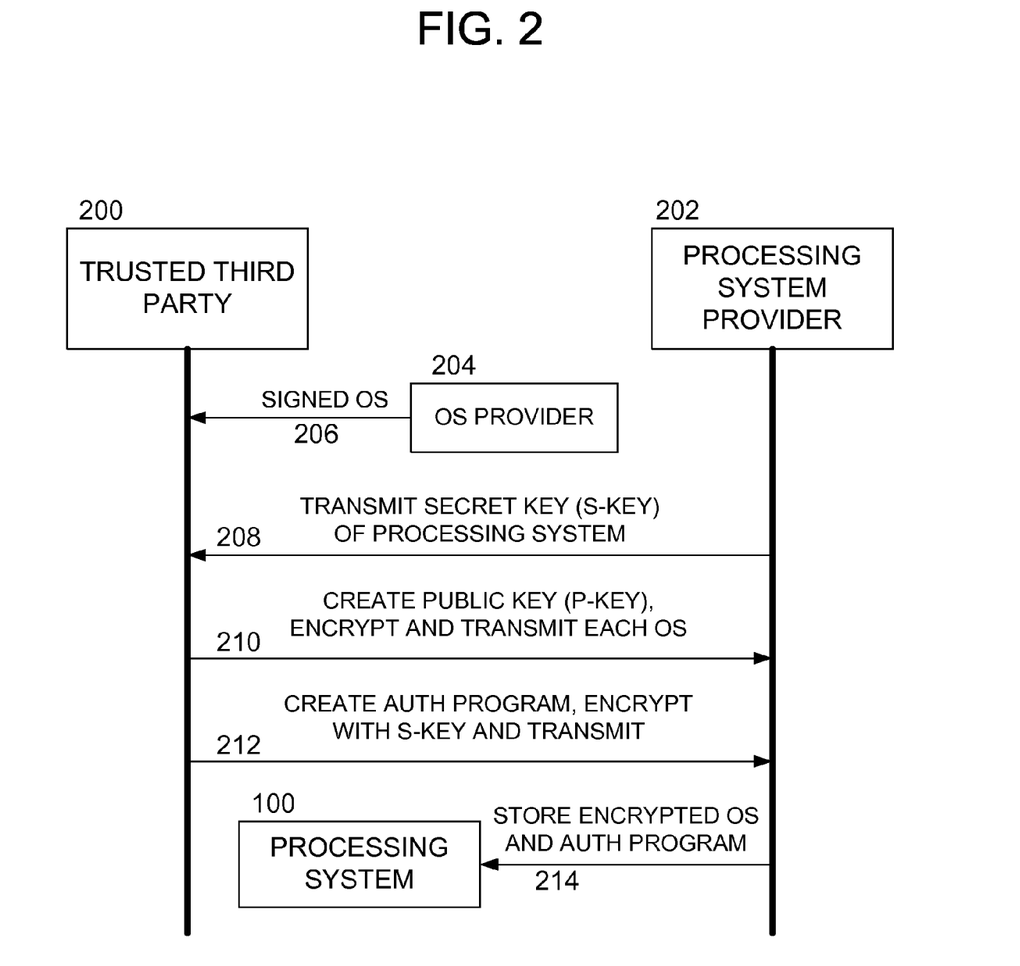
FIG. 2 is a partial flow diagram and partial block diagram representing process steps and/or structure that may be employed by the system of FIG. 1 in accordance with one or more further embodiments of the present invention.

Reference is made to FIG. 2, which is a flow diagram illustrating actions that may be carried out in accordance with one or more aspects of the present invention in order to obtain the encrypted (and signed) operating system programs into the secure ROM 110. For the purposes of illustration, it is assumed that the apparatus 100 is designed and/or manufactured by a processing system provider 202. A trusted third party (or administrator) 200 agrees with the content provider 202 and the designers/manufacturers of the operating systems 204 to perform certain security actions on the operating systems. Preferably, the trusted third party 200 does not manufacture (or provide) the system 100 and does not provide the operating system programs. Instead, the trusted third party 200 agrees to maintain the operating system programs in a secure fashion as they are encrypted and stored into the secure ROM 110, as will be discussed below.

At action 206, the operating system provider 206 forwards one or more operating system programs to the processing system provider 202 or the trusted third party 200. It is understood that the operating system provider 206 may represent more than one entity, such as Microsoft, IBM, Sony, etc., and that one or more of the operating system programs are proprietary. It is most preferred that the operating system provider 206 forwards the one or more operating system programs directly to the trusted third party 200. It is preferred that the operating system provider 206 digitally sign the operating system programs, such as by running one or more hash algorithms on at least a portion of the code to produce a substantially unique digital string (a hash result) representing uncorrupted code. That is, a mathematical formula may be applied to generate a number, typically a string of bits of predetermined length, from a string of text (partial or full) of the OS.

At action 208 (which may occur before or after action 206), the processing system provider 202 preferably provides the trusted third party 200 with a private key (or secret key) S-KEY, which is substantially unique to the multiprocessing system 100.

In response, the trusted third party 200 preferably creates a respective public key for encrypting each of the operating system programs to be stored on the system 100 (action 210). The respective public keys are associated with the S-KEY of the system 100 such that they each form a private/public key pair that may be used to decrypt the operating system programs that are to be provided to the system 100 (and/or the user thereof). It is noted that many multiprocessor systems 100 may be manufactured by the provider 202. Thus, the trusted third party 200 creates one or more public keys for each of the systems 100 to encrypt each of the operating system programs to be stored on each of the systems 100.

The trusted third party 200 encrypts the respective operating system programs and transmits same to the provider 202.

At action 212, the trusted third party 200 encrypts an authentication program using the S-KEY and transmits same to the processing system provider 202. The authentication program may include digital signature information, such as the hash algorithm(s) to be used to verify the digital signatures of the operating system programs. The authentication program may also include a decryption program used to decrypt the operating system programs, as will be discussed below.

At action 214, the processing system provider 202 permanently stores the encrypted OS programs and the authentication program in the secure ROM 110, preferably before the system 100 is sold to the end-user. In alternative embodiments, at least one of the encrypted OS programs and the authentication program may be stored in a non-secure ROM or RAM, such as the main memory 106.

Those skilled in the art will appreciate that the spirit and scope of the foregoing processes may involve one or more intervening entities to complete the various actions, transmission, etc.

Once the above steps have been carried out, the processing system provider 202 may deliver the system 100 to the user and the one or more operating system programs may be invoked in a secure fashion. Notably, the security of the operating system programs has been maintained by the trusted third party (via contract with the providers 204, 202). Tampering with the operating system programs is also prevented via the encrypted storage of same within the secure ROM 110. Further security measures are also preferably carried out during the invocation of the operating systems, even when such is carried out by different processors 102 running in an open (available) system.

Figure 3:
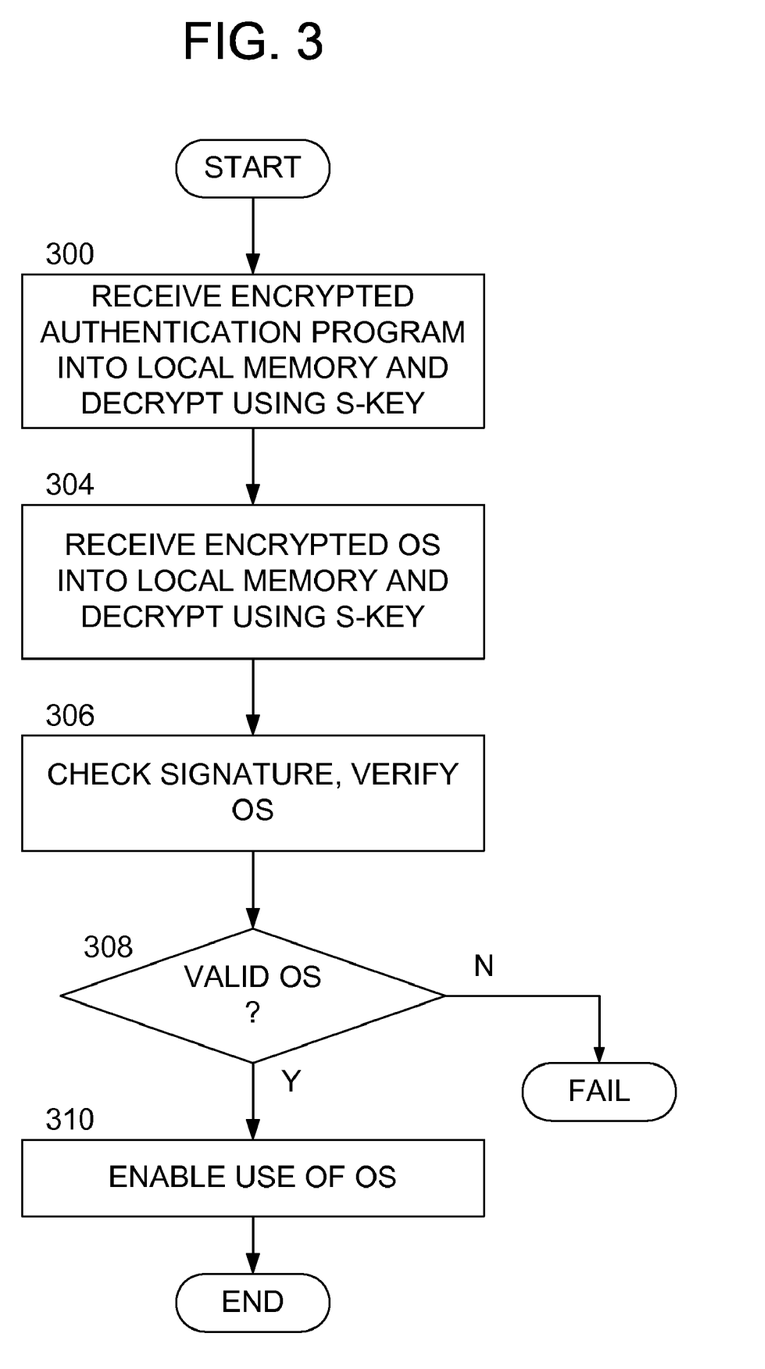
FIG. 3 is a flow diagram illustrating further process steps that may be employed by the system of FIG. 1 in accordance with one or more further embodiments of the present invention.

In this regard, reference is now made to FIG. 3, which illustrates actions that may be carried out in accordance with one or more embodiments of the present invention. At action 300, the encrypted authentication program is preferably read into the local memory 104 of the processor 102. As the authentication program is encrypted, it may have been stored in a less secure storage medium than the secure ROM 110, such as the system memory 106. Thus, the action of reading the encrypted authentication program into the local memory 104 preferably may entail obtaining the encrypted authentication program from the secure ROM 110 or the system memory 106.

In one or more alternative embodiments, the processor 102 is preferably operable to enter a secure mode of operation prior to reading in the encrypted authentication program into the local memory 104. In this secure mode of operation, no requests for data stored in the local memory 104 (or any other memory devices, registers, etc.) of the processor 102 will be serviced, thereby insuring a trusted environment in which to carry out sensitive operations. Despite being in a secure mode, the processor 102 may request the transfer of data from the system memory 106 (or secure ROM 110) into the local memory 104, or may request the transfer of data from the local memory 104 to the system memory 106. Still further, the processor 102 may initiate the transfer of data into and out of the trusted environment irrespective of the source or destination while in the secure mode of operation.

In the embodiments employing the secure ROM 110, an additional security feature may be that the ROM 110 may only be accessed when the processor 102 is in the secure mode of operation.

Once the trusted environment provided by the secure mode of operation is achieved, the processor 102 is preferably operable to invoke the decryption unit (which may be a program stored in the secure ROM 110, or as discussed above, may be a hardware-implemented device, such as a flash ROM that has been programmed utilizing an algorithm defining a decryption process). In particular, the decryption unit is employed to invoke the private S-KEY (which may have also been stored in the secure storage medium 110). The S-KEY is read into the local memory 104 and the encrypted authentication program is preferably decrypted using the decryption unit and the S-KEY. Again, this action assumes that the authentication program was encrypted utilizing the S-KEY provided by the system 202. As the decryption of the authentication program preferably takes place within the trusted environment of the secure processor 102, it may be assumed that the authentication program cannot be tampered with after decryption.

In an alternative embodiment of the invention, the authenticity of the authentication program may be verified. The step of verifying the authenticity of the authentication program may include executing a hash function on the decrypted authentication program to produce a hash result. Thereafter, the hash result may be compared with a predetermined hash value, which may be a digital signature or the like. By way of example, the hash function may be executed on the authentication program by a trusted entity (such as the trusted third party 200) to produce the predetermined hash value. The predetermined hash value may be encrypted with the authentication program itself. As discussed above, the decryption unit is preferably established during manufacture of the apparatus 100. Thus, the decryption unit may include the ability to execute the same hash function that was used by the trusted entity to produce the predetermined hash value. The decryption unit may be operable to execute the hash function on the authentication program to produce the hash result and to compare the hash result with the predetermined hash value. If the hash result and the predetermined hash value match, then it may be assumed that the authentication program has not been tampered with and is authentic.

Once the functionality of the processor 102 has transitioned to the authentication program, one of the encrypted operating system programs is preferably read into the local memory 104 of the processor 102 (action 304). As the OS has been encrypted, it may be assumed that no unauthorized entity (not properly in possession of the private S-KEY) has tampered with the OS. As the authentication program is preferably privy to the S-KEY of the private/public key pair, it is preferably operable to facilitate the decryption of the OS alone or in combination with the decryption unit.

At action 306, an authentication routine is preferably executed on the decrypted OS using the authentication program to verify the authenticity of the OS prior to its execution by the processor 102. In this regard, the step of verifying the authenticity of the OS may include executing a hash function on the decrypted OS to produce a hash result. Thereafter, the hash result may be compared with a predetermined hash value, which may be the digital signature. The authentication program may include the ability to execute the same hash function that was used to produce the digital signature of the OS. The authentication program may be operable to execute the hash function on the OS to produce the hash result and to compare the hash result with the digital signature. If the hash result and the predetermined hash value match, then it may be assumed that the OS has not been tampered with and is authentic.

At action 310, a determination is preferably made as to whether the OS is valid and authentic. If the result of the determination is negative, then the process flow preferably advances to a failed state where appropriate actions are taken. For example, the authentication process may be retried, a message may be delivered to an operator of the apparatus 100 indicating the failure to authenticate the OS, or other such actions may be taken. If the result of the determination at action 308 is in the affirmative, then the process flow preferably advances to action 310, where the functionality of the processor 102 is preferably transitioned from the authentication program to OS execution.

Thereafter, the processor 102 may leave the secure mode (if employed) and execute application program(s) and the like. At such point, security features (if any) inherent in the OS program itself will be relied upon to maintain security thereof.

Notably, the processors 102 within the system 100 may execute different OSs concurrently and/or may change OSs from time to time as desired by a programmer. To change the OS, the processor may repeat some or all of the process steps discussed above with respect to FIG. 3.

It is also noted that the above-described process of invoking an OS may be carried out as part of the initialization and/or boot-up process. In such a case, the boot-up process may itself be secure as described in U.S. 60/650,506, the entire disclosure of which is hereby incorporated by reference.

A description of computer architecture for a multiprocessor system will now be provided that is suitable for carrying out one or more of the features discussed herein. In accordance with one or more embodiments, the multiprocessor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multiprocessor system must complete tasks in a short and predictable time.

To this end, and in accordance with this computer architecture, all processors of a multiprocessing computer system are constructed from a common computing module (or cell). This common computing module has a consistent structure and preferably employs the same instruction set architecture. The multiprocessing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multiprocessing computer system, and if a network is employed, the rapid transmission of applications and data over the network. This structure also simplifies the building of members of the network of various sizes and processing power and the preparation of applications for processing by these members.

Figure 4:
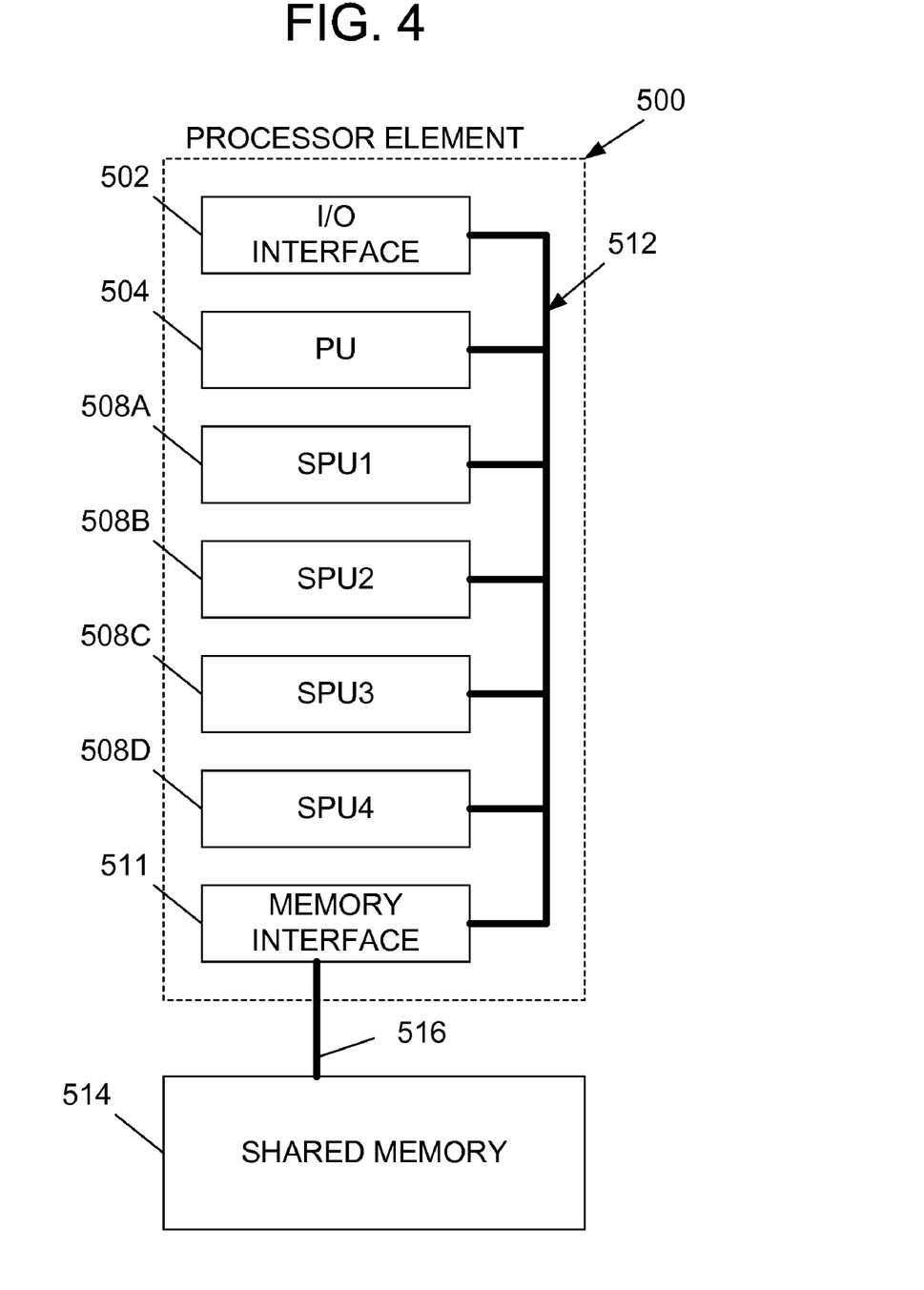
FIG. 4 is a block diagram illustrating a preferred processor element (PE) that may be used to implement one or more further aspects of the present invention.

With reference to FIG. 4, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsenide, gallium aluminum arsenide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 5:
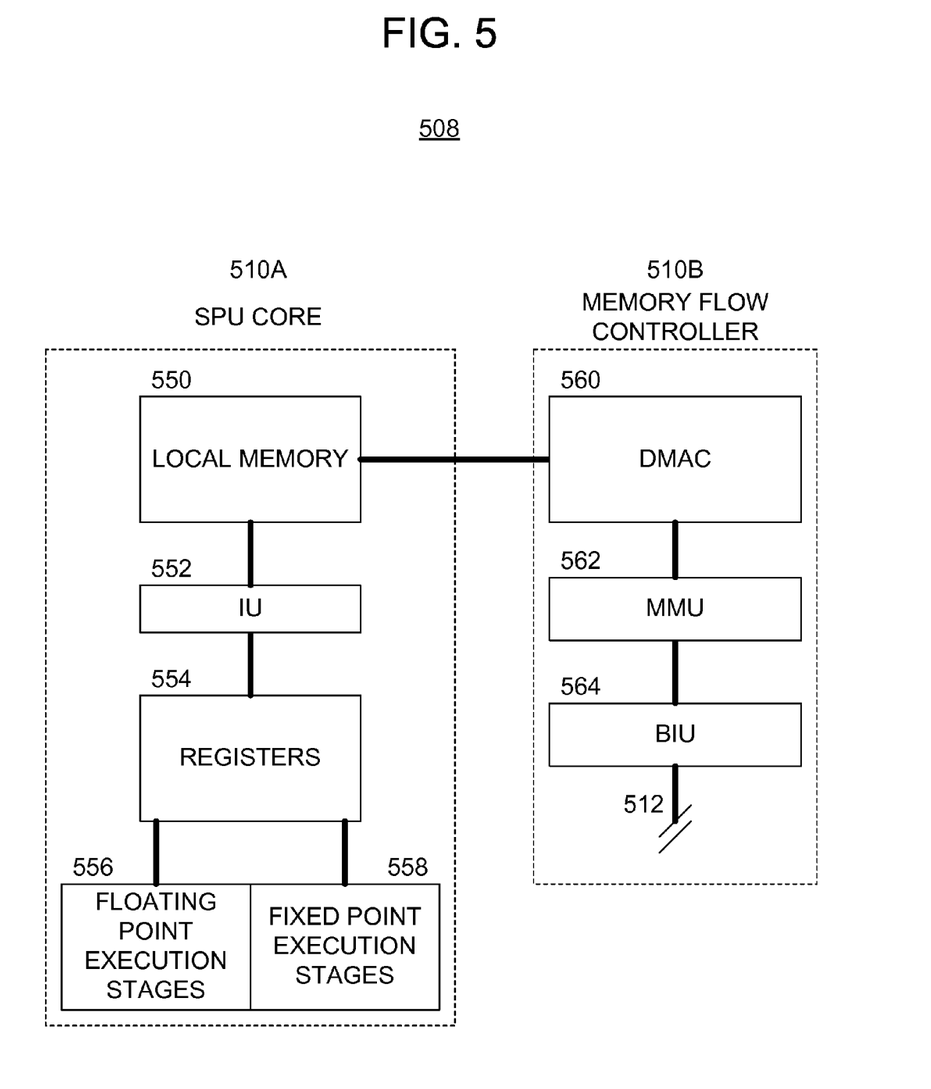
FIG. 5 is a block diagram illustrating the structure of an exemplary sub-processing unit (SPU) of the system of FIG. 4 that may be adapted in accordance with one or more further aspects of the present invention.

FIG. 5 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broad-band systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution).

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560.

Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 6:
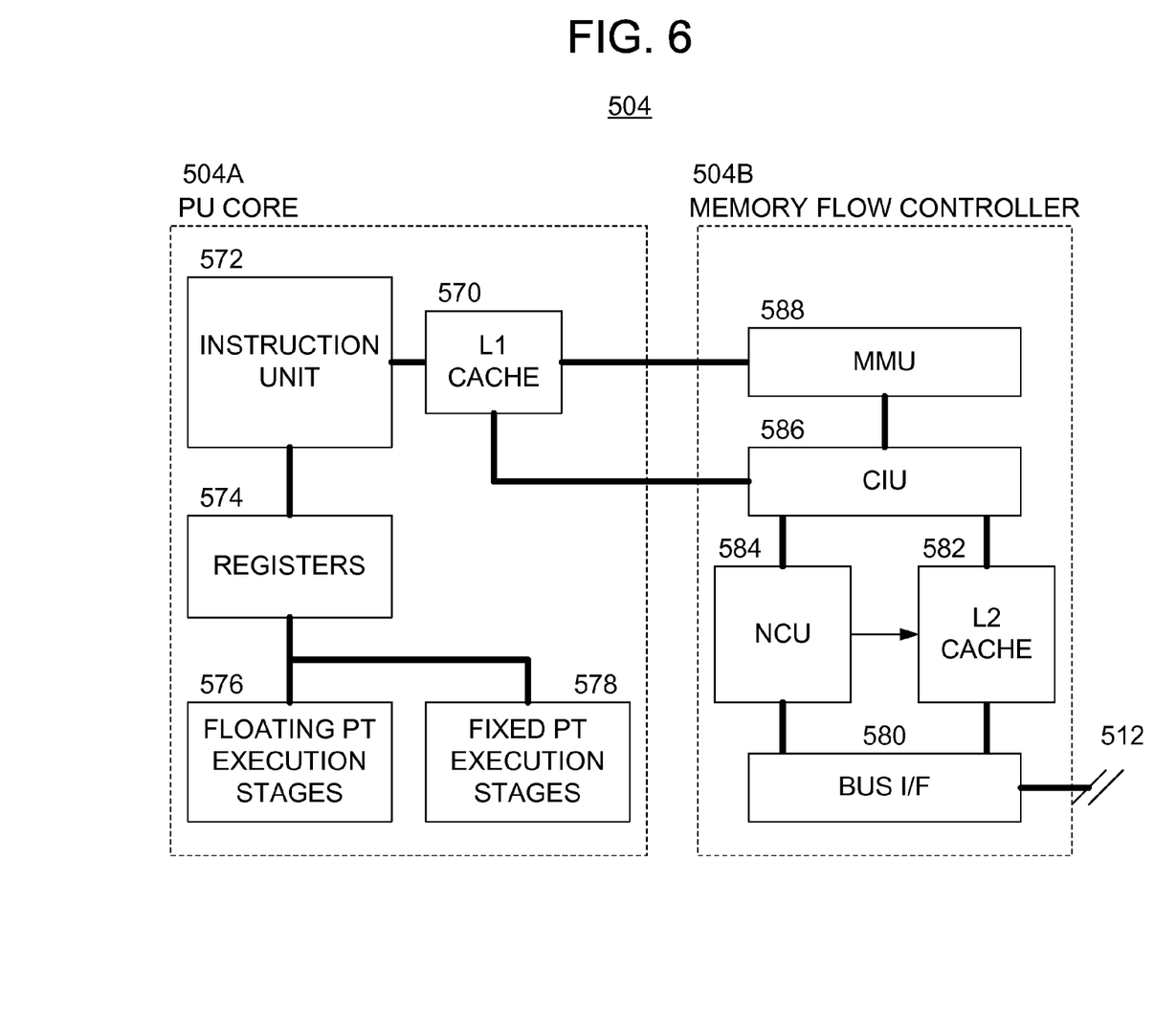
FIG. 6 is a block diagram illustrating the structure of an exemplary processing unit (PU) of the system of FIG. 4 that may be adapted in accordance with one or more further aspects of the present invention.

FIG. 6 illustrates the preferred structure and function of the PU 504. The PU 504 includes two basic functional units, the PU core 504A and the memory flow controller (MFC) 504B. The PU core 504A performs program execution, data manipulation, multiprocessor management functions, etc., while the MFC 504B performs functions related to data transfers between the PU core 504A and the memory space.

The PU core 504A may include an L1 cache 570, an instruction unit 572, registers 574, one or more floating point execution stages 576 and one or more fixed point execution stages 578. The L1 cache provides data caching functionality for data received from the main memory, the processors, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A to meet low power dissipation design objectives.

The BIU 580 provides an interface between the bus and the L2 cache 582 and NCU 584 logic blocks. To this end, the BIU 580 may act as a Master as well as a Slave device on the bus in order to perform fully coherent memory operations. As a Master device it may source load/store requests to the bus for service on behalf of the L2 cache 582 and the NCU 584. The BIU 580 may also implement a flow control mechanism for commands which limits the total number of commands that can be sent to the bus. The data operations on the bus may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multiprocessing system, comprising:
a plurality of processors, each including a respective local memory in which to execute programs and interconnected with each other via an internal bus;
a main memory operatively coupled to the processors and adapted to respond to data load and data store requests from the processors;
a private key stored in the system, the private key being unique to the multiprocessing system;
a secure storage medium comprising a plurality of operating system (OS) programs stored within the system, the plurality of OSs having been encrypted by a trusted third party, other than a manufacturer of the multiprocessing system, using respective public keys, each paired with the private key, wherein at least one of the processors is operable to: decrypt a first of the OSs using the private key, execute an authentication program to verify that the first OS is valid, execute the first OS if the OS is valid, terminate execution of the first OS, decrypt a second of the plurality of OSs using the private key, execute the authentication program to verify that the second OS is valid, and execute the second OS if valid.

2. The system according to claim 1, wherein at least two of the processors are operable to: decrypt, verify and execute different ones of the OSs, and execute same concurrently.

3. The system according to claim 1, wherein the plurality of OSs have been digitally signed prior to encryption and the authentication program includes verifying the digital signature.

4. The system according to claim 3, wherein the digital signature of each OS includes a respective hash value and the authentication program verifies the digital signature of a given one of the OSs by running a hash program thereon and comparing a hash result with the respective hash value.

5. The system according to claim 1, further comprising at least one secure storage medium in which the encrypted OSs are stored, the at least one secure storage medium being accessible only by the processors of the multiprocessor system.

6. The system according to claim 1, wherein the at least one processor is further operable to enter into a secure mode prior to decrypting the authentication program, the secure mode permitting data transfers into and out of the at least one processor that are initiated by the at least one processor but prohibiting data transfers into and out of the at least one processor that are initiated by external devices to the at least one processor.

7. The system according to claim 6, wherein the at least one processor is further operable to leave the secure mode after the first OS has been authenticated.

8. The system according to claim 7, wherein the at least one processor is further operable to: terminate execution of the first OS; re-enter the secure mode of operation; and decrypt, verify and execute a second of the OSs if valid.

9. A method, comprising:
storing a plurality of encrypted operating systems within a secure storage medium of a multiprocessor system comprising a plurality of processors connected to each other with an internal bus;
decrypting a first of a plurality of operating systems (OSs) within a first processor of the multiprocessor system using a private key unique to the multiprocessor system, the plurality of OSs having been encrypted by a trusted third party, other than a manufacturer of the multiprocessing system, using respective public keys, each paired with the private key;
executing an authentication program using the first processor to verify that the first OS is valid;
executing the first OS on the first processor;
terminating execution of the first OS on the first processor;
decrypting a second of the plurality of OSs within the first processor using the private key;
executing the authentication program using the first processor to verify that the second OS is valid; and
executing the second OS on the first processor.

10. The method according to claim 9, further comprising:
decrypting a second of the plurality of OSs within a second processor of the multiprocessing system using the private key thereof;
executing the authentication program using the second processor to verify that the second OS is valid; and
executing the second OS on the second processor.

11. The method according to claim 10, wherein the first and second OSs are executed simultaneously.

12. The method according to claim 9, wherein the plurality of OSs have been digitally signed prior to encryption and the authentication program includes verifying the digital signature.

13. The method according to claim 12, wherein the digital signature of each OS includes a respective hash value and the authentication program verifies the digital signature of a given one of the OSs by running a hash program thereon and comparing a hash result with the respective hash value.

14. The method according to claim 9, further comprising storing the encrypted OSs in at least one secure storage medium which is accessible only by the processors of the multiprocessing system.

15. The method according to claim 9, further comprising entering into a secure mode of the first processor prior to decrypting the authentication program, the secure mode permitting data transfers into and out of the first processor that are initiated by the first processor but prohibiting data transfers into and out of the first processor that are initiated by external devices to the first processor.

16. The method according to claim 15, further comprising leaving the secure mode after the first OS has been authenticated.

17. A method, comprising:
transmitting a private key associated with a particular multiprocessor system comprising a plurality of processors connected via an internal bus to a trusted third party, other than a manufacturer of the multiprocessor system;
receiving a plurality of operating systems (OSs) from the trusted third party, each OS having been encrypted by the trusted third party using respective public keys, each paired with the private key;
storing the plurality of OSs within at least one secure storage medium of the multiprocessor system, such that each may be executed by one or more processors of the multiprocessor system thereof;
receiving an authentication program from the trusted third party, the authentication program having been encrypted by the trusted third party using the private key; and
storing the authentication program within the at least one secure storage medium of the multiprocessor system, such that it may be executed by the one or more processors to verify the OSs.

18. A method, comprising:
receiving a private key associated with a particular multiprocessing system from a provider of the multiprocessing system that comprises a plurality of processors connected via an internal bus;
encrypting a plurality of operating systems (OSs), each with a respective public key that is paired with the private key; and
transmitting the encrypted OSs to the provider for secure storage in the multiprocessing system such that each may be executed by one or more processors thereof.

* * * * *